United States Patent
An et al.

(10) Patent No.: US 8,945,786 B2
(45) Date of Patent: Feb. 3, 2015

(54) FUEL CELL STACK AND FUEL CELL SYSTEM INCLUDING THE SAME

(75) Inventors: Seong-Jin An, Yongin-si (KR); Chi-Seung Lee, Yongin-si (KR); Jin-Hwa Lee, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 627 days.

(21) Appl. No.: 12/926,730

(22) Filed: Dec. 7, 2010

(65) Prior Publication Data

US 2011/0143247 A1   Jun. 16, 2011

(30) Foreign Application Priority Data

Dec. 15, 2009   (KR) .......................... 10-2009-0125059

(51) Int. Cl.
*H01M 8/04* (2006.01)
*H01M 8/02* (2006.01)
*H01M 8/10* (2006.01)

(52) U.S. Cl.
CPC .......... *H01M 8/0267* (2013.01); *H01M 8/0258* (2013.01); *H01M 8/0228* (2013.01); *H01M 8/0265* (2013.01); *H01M 2008/1095* (2013.01); *Y02E 60/50* (2013.01)
USPC ............ 429/433; 429/437; 429/439; 429/457

(58) Field of Classification Search
CPC .......................... H01M 8/0267; H01M 8/0258
USPC .................................. 429/433, 437, 439, 457
See application file for complete search history.

(56) References Cited

U.S. PATENT DOCUMENTS

| | | | |
|---|---|---|---|
| 4,324,844 A * | 4/1982 | Kothmann | 429/434 |
| 7,879,504 B2 * | 2/2011 | Suh | 429/457 |
| 8,148,035 B2 * | 4/2012 | Dadheech et al. | 429/535 |
| 8,153,316 B2 * | 4/2012 | Pierpont et al. | 429/434 |
| 2007/0207372 A1 | 9/2007 | Kikuchi et al. | |

FOREIGN PATENT DOCUMENTS

| | | |
|---|---|---|
| JP | 2006-147466 A | 6/2006 |
| JP | 2007-234438 A | 9/2007 |
| JP | 2007-299661 A | 11/2007 |

* cited by examiner

*Primary Examiner* — Tracy Dove
(74) *Attorney, Agent, or Firm* — Lee & Morse, P.C.

(57) ABSTRACT

A fuel cell stack and a fuel cell system, the fuel cell stack including a plurality of membrane electrode assemblies, the membrane electrode assemblies being configured to generate electrical energy by an electrochemical reaction of a fuel and an oxidizer; and a plurality of bipolar plates positioned adjacent to the membrane electrode assemblies and between the membrane electrode assemblies, the bipolar plates including a fuel channel at one side thereof and an oxidizer channel at a second, opposite side thereof, wherein the bipolar plates include a plurality of cooling channels penetrating therethrough, the cooling channels having a curvature along a length thereof.

15 Claims, 7 Drawing Sheets

FUEL CELL STACK AND FUEL CELL SYSTEM INCLUDING THE SAME

BACKGROUND

1. Field

Embodiments relate to a fuel cell stack and a fuel cell system including the same.

2. Description of the Related Art

A fuel cell system uses a fuel (e.g., a hydrocarbon fuel, hydrogen, or a reformed gas containing a significant amount of hydrogen) and an oxidizer (e.g., oxygen or air) to generate power electrochemically. The fuel cell stack may include a plurality of membrane electrode assemblies (MEAs) and a bipolar plate between the membrane electrode assemblies. Thus, the fuel cell stack may generate electrical energy and water by an electrochemical reaction of a fuel and an oxidizer in the membrane electrode assembly.

A fuel channel may be disposed on a first side of the bipolar plate to uniformly supply a fuel to an anode of the membrane electrode assembly that faces the fuel channel. An oxidizer channel may be disposed on a second side of the bipolar plate to uniformly supply an oxidizer to a cathode of the membrane electrode assembly that faces the oxidizer channel. In the case of an air-cooled fuel cell system, a plurality of cooling channels may be disposed in the bipolar plate, penetrating the bipolar plate.

The bipolar plate may be made of, e.g., graphite or metal. Two sub-bipolar plates may be individually manufactured and then assembled into a single body. That is, the bipolar plate may be manufactured by preparing a first sub-plate that is mechanically processed with, e.g., graphite or metal, to have a fuel channel at a first side and a cooling channel at a second, opposite side, preparing a second sub-plate having an oxidizer channel at a first side and a half shape of the cooling channel at a second opposite side, and assembling the first and second sub-plates into a single body. Injection molding or compression molding may be used for mass production of the first and second sub-plates.

The above information disclosed in this Background section is only for enhancement of understanding of the background of the described technology and therefore it may contain information that does not form the prior art that is already known in this country to a person of ordinary skill in the art.

SUMMARY

Embodiments are directed to a fuel cell stack and a fuel cell system including the same, which represents advances over the related art.

It is a feature of an embodiment to provide a fuel cell stack having a bipolar plate with improved cooling efficiency and improved flexural strength.

At least one of the above and other features and advantages may be realized by providing a fuel cell stack including a plurality of membrane electrode assemblies, the membrane electrode assemblies being configured to generate electrical energy by an electrochemical reaction of a fuel and an oxidizer; and a plurality of bipolar plates positioned adjacent to the membrane electrode assemblies and between the membrane electrode assemblies, the bipolar plates including a fuel channel at one side thereof and an oxidizer channel at a second, opposite side thereof, wherein the bipolar plates include a plurality of cooling channels penetrating therethrough, the cooling channels having a curvature along a length thereof.

The bipolar plate may have a quadrangle shape, and the plurality of cooling channels may connect two short sides of the bipolar plate.

The curvature of the plurality of cooling channels may be concave toward a center of the bipolar plate.

The plurality of cooling channels may have a same width and curvature.

A cooling channel at a center of the bipolar plate from among the plurality of cooling channels may have a width greater than a width of a cooling channel near an end of the bipolar plate.

Two cooling channels at an innermost part of the bipolar plate from among the plurality of cooling channels may have a width greater than a width of other cooling channels.

Each cooling channel may have two curvature centers, and the two curvature centers may be provided at opposite sides of each other with respect to a long axis of the bipolar plate.

The curvature of the cooling channels may be set such that an opposite terminal of the cooling channel is not exposed when the bipolar plate is observed at a terminal of the cooling channel on one of the short sides.

The bipolar plate may have an assembly structure including a first sub-plate having a first side on which the fuel channel is formed and a second side on which a half cooling channel is formed, and a second sub-plate having a first side on which the oxidizer channel is formed and a second opposite side on which a half cooling channel is formed.

The half cooling channel of the first sub-plate and the half cooling channel of the second sub-plate may form the cooling channel, and the two half cooling channels may have the same width and depth.

At least one of the above and other features and advantages may also be realized by providing a fuel cell system including a fuel cell stack including a plurality of membrane electrode assemblies, and a plurality of bipolar plates between the membrane electrode assemblies, the bipolar plates including a plurality of cooling channels; a fuel supply connected to the fuel cell stack; an oxidizer supply connected to the fuel cell stack; and a ventilator adjacent to the plurality of cooling channels, the ventilator being configured to provide cooling fluid to the plurality of cooling channels, wherein the plurality of cooling channels are curved from one side of the bipolar plate to an opposite side thereof and penetrate the bipolar plate.

The bipolar plate may have a quadrangle shape, the plurality of cooling channels may connect two short sides of the bipolar plate, and the ventilator may be adjacent to one short side of the bipolar plate.

The plurality of cooling channels may be curved to be concave toward a center of the bipolar plate.

The plurality of cooling channels may have two curvature centers, the two curvature centers being at opposite sides of the bipolar plate.

A curvature of the cooling channels may be set such that an opposite terminal of the cooling channel is not exposed when the bipolar plate is observed at one of the short sides.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0125059, filed on Dec. 15, 2009, in the Korean Intellectual Property Office, and entitled: "Fuel Cell Stack and Fuel Cell System Having the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
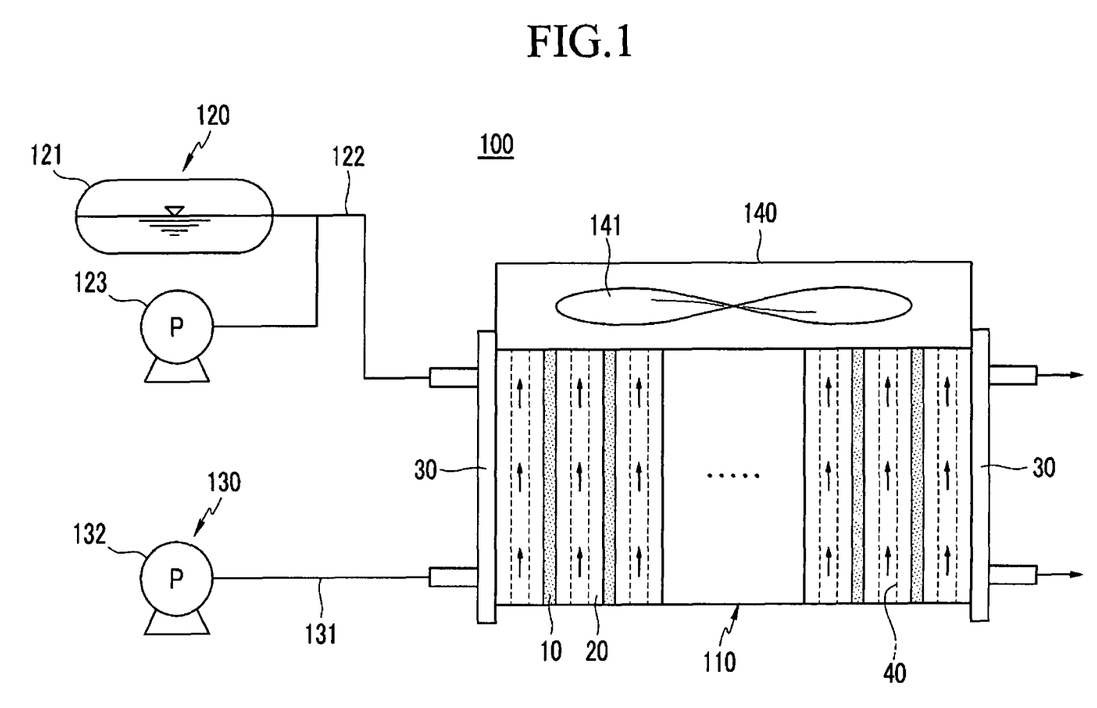
FIG. 1 illustrates a schematic diagram of a fuel cell system according to an embodiment.

FIG. 1 illustrates a schematic diagram of a fuel cell system according to an embodiment.

Referring to FIG. 1, the fuel cell system 100 may be configured as a direct oxidation fuel cell system for generating electrical energy by using a direct electrochemical reaction of, e.g., a liquid fuel or a gaseous fuel, and an oxidizer.

However, the embodiments are not restricted to the direct oxidation fuel cell system; and the fuel cell system may be configured as a polymer electrode membrane fuel cell system for generating reformed hydrogen or a gas containing a lot of hydrogen by reforming a fuel, and generating electrical energy by electrochemically reacting hydrogen or the reformed gas and the oxidizer. In this case, the fuel cell system may further include a reformer for reforming hydrogen.

The fuel cell system 100 may utilize liquid or gaseous hydrocarbon fuels including, e.g., methanol, ethanol, liquefied natural gas, liquefied petroleum gas, gasoline, and/or butane gas. The fuel cell system 100 may use, e.g., oxygen, stored in another storage means or air as the oxidizer.

The fuel cell system 100 may include a fuel cell stack 110 for generating electrical energy by electrochemically reacting the fuel and the oxidizer, a fuel supply 120 for supplying the fuel to the fuel cell stack 110, an oxidizer supply 130 for supplying the oxidizer to the fuel cell stack 110, and a ventilator 140 for providing a cooling fluid to the fuel cell stack 110.

The fuel supply 120 may include a fuel tank 121 for storing the liquid or gaseous fuel, a fuel supply duct 122 for connecting the fuel tank 121 and the fuel cell stack 110, and a fuel pump 123 connected to the fuel tank 121. The fuel pump 123 may pump the fuel stored in the fuel tank 121 to supply the fuel to the fuel cell stack 110 through the fuel supply duct 122.

The oxidizer supply 130 may include an oxidizer supply duct 131 connected to the fuel cell stack 110 and an oxidizer pump 132 in the oxidizer supply duct 131. In an implementation, the oxidizer pump 132 may pump external air to supply the oxidizer to the fuel cell stack 110 through the oxidizer supply duct 131. Here, a valve (not shown) for controlling supply of the oxidizer may be installed in the oxidizer supply duct 131.

The ventilator 140 may be positioned closely adjacent to a first end of the fuel cell stack 110. The ventilator 140 may include a fan 141 for moving cooling fluid (e.g., external air). The ventilator 140 may be connected to a cooling channel 40 of a bipolar plate 20 in the fuel cell stack 110. Thus, the external air may enter into the cooling channel 40 by suction force of the fan 141. The fuel cell system 100 may have an air cooling structure for cooling the fuel cell stack 110 by using air.

Figure 2:
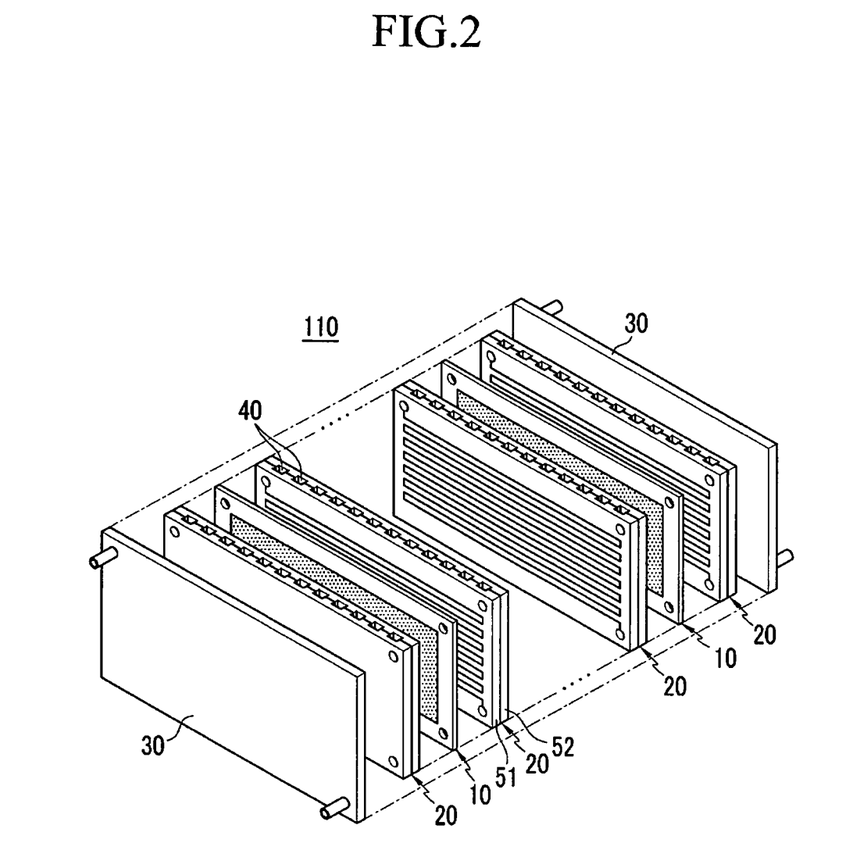
FIG. 2 illustrates an exploded perspective view of a fuel cell stack in a fuel cell system according to an embodiment.

FIG. 2 illustrates an exploded perspective view of the fuel cell stack of the fuel cell system of FIG. 1.

Referring to FIG. 2, the fuel cell stack 110 may include a plurality of membrane electrode assemblies 10 and a plurality of bipolar plates 20 closely adjacent to and between the membrane electrode assemblies 10. One membrane electrode assembly 10 and two bipolar plates 20 disposed on respective sides of the membrane electrode assembly 10 may configure, i.e., form, an electricity generation unit (unit cell) for generating electrical energy. The bipolar plate 20 may also be called a separator.

An end plate 30 for supporting the fuel cell stack 110 may be disposed at an outermost part of the fuel cell stack 110. The fuel cell stack 110 may be firmly assembled by fasteners (not shown), e.g., a bolt penetrating through the two end plates 30.

Figure 3:
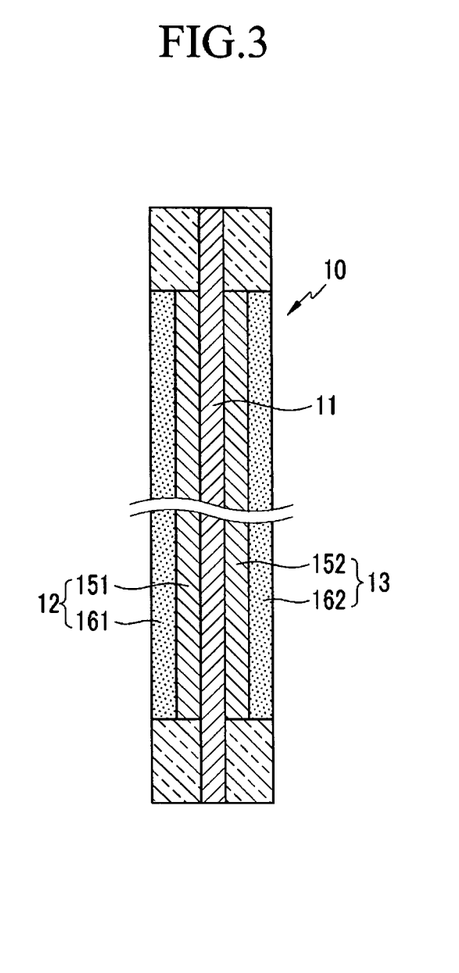
FIG. 3 illustrates a cross-sectional view of a membrane electrode assembly of the fuel cell stack of FIG. 2.

FIG. 3 illustrates a cross-sectional view of a membrane electrode assembly in the fuel cell stack of FIG. 2.

Referring to FIG. 2 and FIG. 3, the membrane electrode assembly 10 may include an electrolyte film 11, an anode 12 at a first side of the electrolyte film 11, and a cathode 13 at a second side of the electrolyte film 11.

The anode 12 may receive fuel from the bipolar plate 20. The anode 12 may include a catalyst film 151 for transforming hydrogen gas of the fuel into electrons and protons by an oxidation reaction and a gas diffusion layer 161 outside the catalyst film 151, the gas diffusion layer 161 activating movements of the electrons and the protons.

The cathode 13 may receive the oxidizer from the bipolar plate 20. The cathode 13 may include a catalyst film 152 for transforming oxygen in the oxidizer into electrons and oxygen ions by a reduction reaction and a gas diffusion layer 162 outside the catalyst film 152, the gas diffusion layer 162 activating movement of the electrons and the oxygen ions.

The electrolyte film 11 may be made of, e.g., a solid polymer electrolyte, and may have a thickness of about 50 μm to about 200 μm. The electrolyte film 11 may serve an ion exchange function for moving protons generated at the catalyst film 151 of the anode 12 to the catalyst film 152 of the cathode 13.

Figure 4:
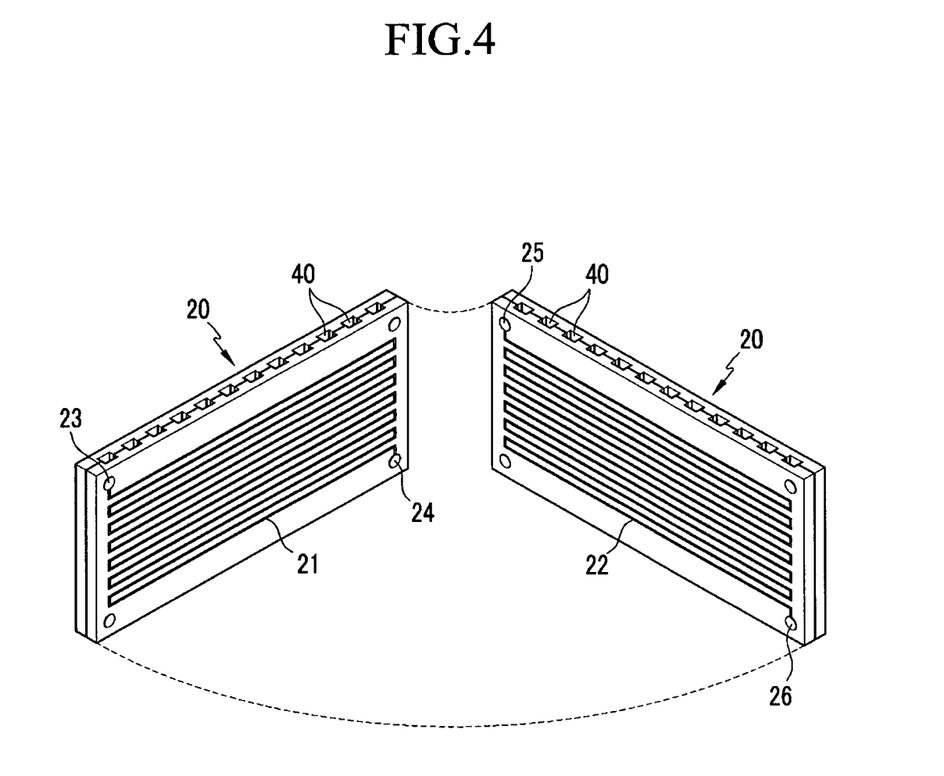
FIG. 4 illustrates a perspective view of two bipolar plates of the fuel cell stack of FIG. 2.

FIG. 4 illustrates a perspective view of two bipolar plates of the fuel cell stack of FIG. 2.

Referring to FIG. 2 and FIG. 4, the bipolar plate 20 may function as a conductor for coupling the anode 12 of the membrane electrode assembly 10 at a first end and the cathode 13 of the membrane electrode assembly 10 at a second end in series.

The bipolar plate 20 may include a fuel channel 21 for supplying the fuel at a side facing the anode 12. The bipolar plate 20 may include an oxidizer channel 22 for supplying the oxidizer at a side facing the cathode 13. The fuel channel 21 and the oxidizer channel 22 may be formed as, e.g., a concave groove in a zigzag pattern.

A fuel inlet manifold 23 and a fuel outlet manifold 24 connected to the fuel channel 21 may be disposed at corners of the bipolar plate 20 so as to supply the fuel. Also, an oxidizer inlet manifold 25 and an oxidizer outlet manifold 26 connected to the oxidizer channel 22 may be disposed on other corners of the bipolar plate 20 so as to supply the oxidizer.

The above-configured fuel cell stack 110 may generate heat while generating electrical energy, hence the heat must be reduced, i.e., dissipated. To achieve this heat reduction, a plurality of cooling channels 40 penetrating through the bipolar plate 20 may be disposed in one direction and between the fuel channel 21 and the oxidizer channel 22.

A first terminal of the cooling channel 40 may be adjacent to the ventilator 140 (refer to FIG. 1), and external air may pass through the cooling channel 40 due to the suction force of the fan 141 (refer to FIG. 1). Overheating of the fuel cell stack 110 may be prevented by thermal exchange of the external air and the fuel cell stack 110. Warm air thermally exchanged in the fuel cell stack 110 may be output to the outside through the fan 141.

Figure 5:
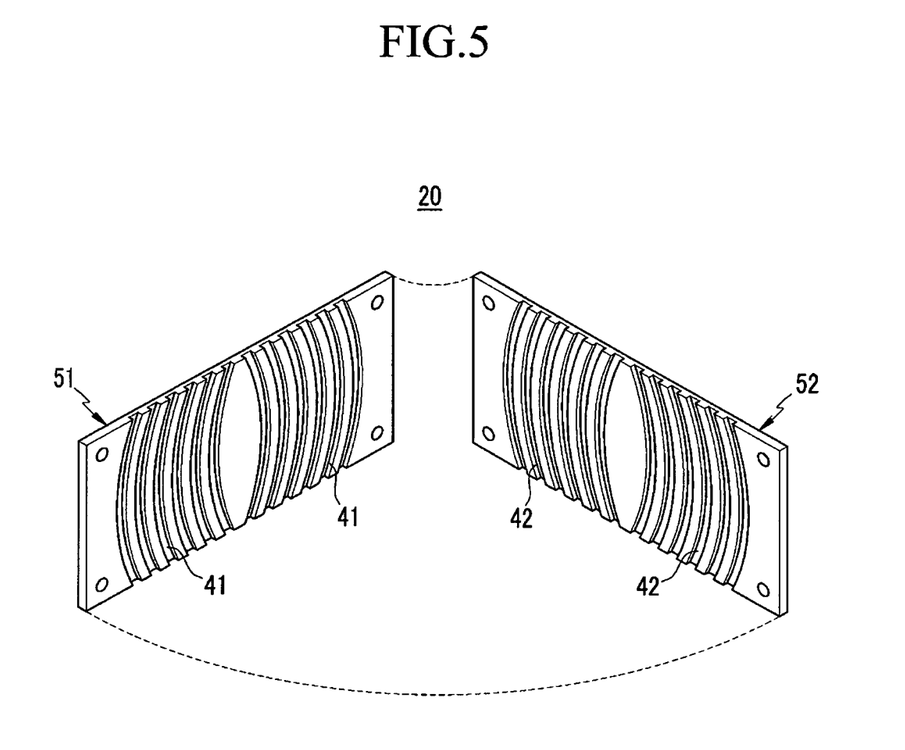
FIG. 5 illustrates an exploded perspective view of the bipolar plate of FIG. 4.

FIG. 5 illustrates an exploded perspective view of the bipolar plate of FIG. 4.

Referring to FIG. 4 and FIG. 5, the bipolar plate 20 may be produced by respectively manufacturing a first sub-plate 51 and a second sub-plate 52 and then assembling the sub-plates 51 and 52 into a single body. The first and second sub-plates 51 and 52 may each have a quadrangle shape with a pair of long edges and a pair of short edges and with a certain thickness, and may be manufactured by, e.g., mechanically processing graphite or metal by injection molding or compression molding.

The first sub-plate 51 may include a plurality of half cooling channels 41 on a first side thereof that faces the second sub-plate 52. The second sub-plate 52 may include a plurality of half cooling channels 42 on a first side thereof that faces the first sub-plate 51. The two half cooling channels 41 and 42 may have the same width and depth; and a combination of the two half cooling channels 41 and 42 may configure, i.e., form, a cooling channel 40.

The half cooling channels 41 and 42 may connect two of the short sides of the first and second sub-plates 51 and 52. The half cooling channels 41 and 42 may be curved, i.e., have a curvature, rather than extend as a straight line. The curved cooling channel 40 may improve flexural strength along a long-axis direction of the first and second sub-plates 51 and 52 while not generating excessive resistance against cooling fluid flow.

In the fuel cell stack 110 of the present embodiment, a plurality of half cooling channels 41 and 42 may be concave toward centers of the first and second sub-plates 51 and 52. In other words, when the first and second sub-plates 51 and 52 are divided into two areas with respect to a short-axis direction, a plurality of half cooling channels 41 and 42 in the first area (left area) may be concave toward the second area (right area) and a plurality of half cooling channels 41 and 42 in the second area (right area) may be concave toward the first area (left area).

The plurality of cooling channels 40 may have the same width and curvature in order to control a length of a flow channel through which cooling fluid passes to correspond to resistance of flow velocity.

The curvature of the cooling channel 40 may be set such that an opposing terminal of the cooling channel 40 may not be seen when the bipolar plate 20 is observed from one of the short sides. In other words, the cooling channel 40 may be curved to such a degree that there is no straight line extending all the way therethrough. When the opposite terminal of the cooling channel 40 may be seen, the cooling channel 40 may be an almost straight line, and thus no flexural strength improvement due to the curved cooling channel 40 may be expected.

Since the plurality of cooling channels 40 may be curved, the flexural strength in the long-axis direction may be improved. That is, if a plurality of cooling channels extend in a straight line along the short-axis direction, flexural strength may be substantially deteriorated in the long-axis direction, i.e., perpendicular to the short-axis direction. In the present embodiment, the plurality of cooling channels 40 may not extend in a specific direction, but rather may be bent, thereby ensuring no flexural strength deterioration in the specific direction.

Therefore, bending of the first and second sub-plates 51 and 52 may be prevented since they may maintain a flat state in the long-axis direction after molding. Also, since the plurality of cooling channels 40 may be bent smoothly rather than steeply, cooling efficiency of the fuel cell stack 110 may be increased by minimizing resistance to cooling fluid flow.

Figure 6:
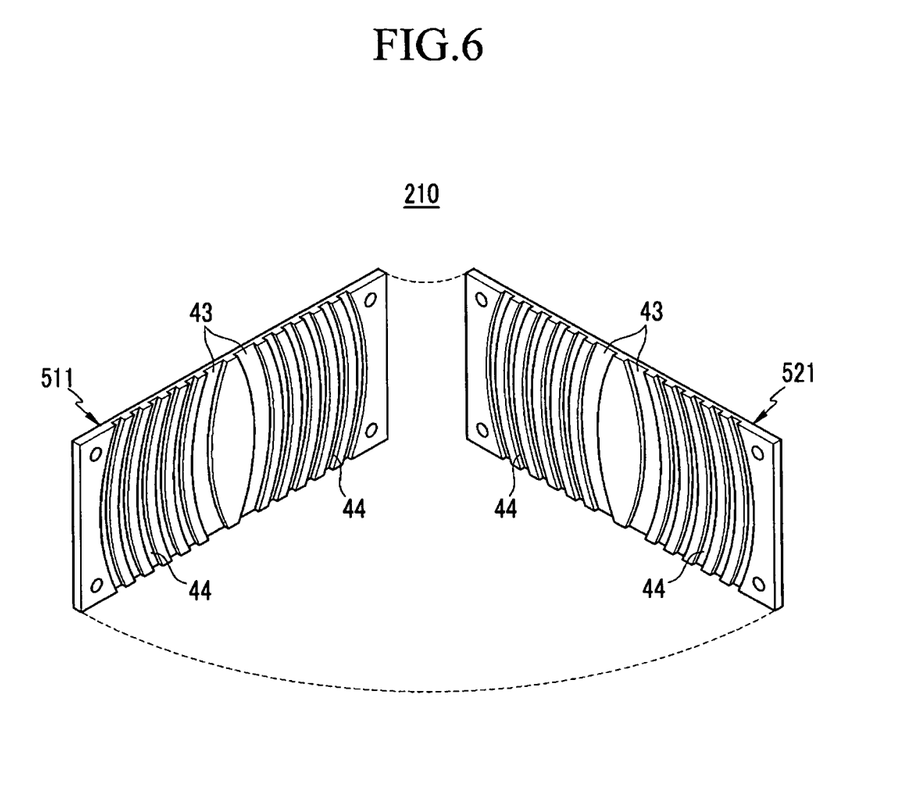
FIG. 6 illustrates an exploded perspective view of a bipolar plate in a fuel cell stack according to another embodiment.

FIG. 6 illustrates an exploded perspective view of a bipolar plate in a fuel cell stack according to another embodiment.

Referring to FIG. 6, the bipolar plate 210 may be the same as the bipolar plate according to the previous embodiment, except that a width of the half cooling channels 43 at centers of the first and second sub-plates 511 and 521 may be greater than a width of the half cooling channels 44 near ends of, i.e., away from the centers of, the first and second sub-plates 511 and 521.

Since there may be no cooling channel in the center of the bipolar plate 210 due to the concave shape of the half cooling channels 43 and 44, cooling efficiency may be deteriorated towards the center of the fuel cell stack 110. However, cooling efficiency deterioration may be compensated for by forming the two half cooling channels 43 at an innermost part of the first and second sub-plates 511 and 521 to be wider than a width of other half cooling channels 44. Thus, cooling efficiency may be improved by providing much more cooling fluid flowing to the center of the bipolar plate 210.

Figure 7:
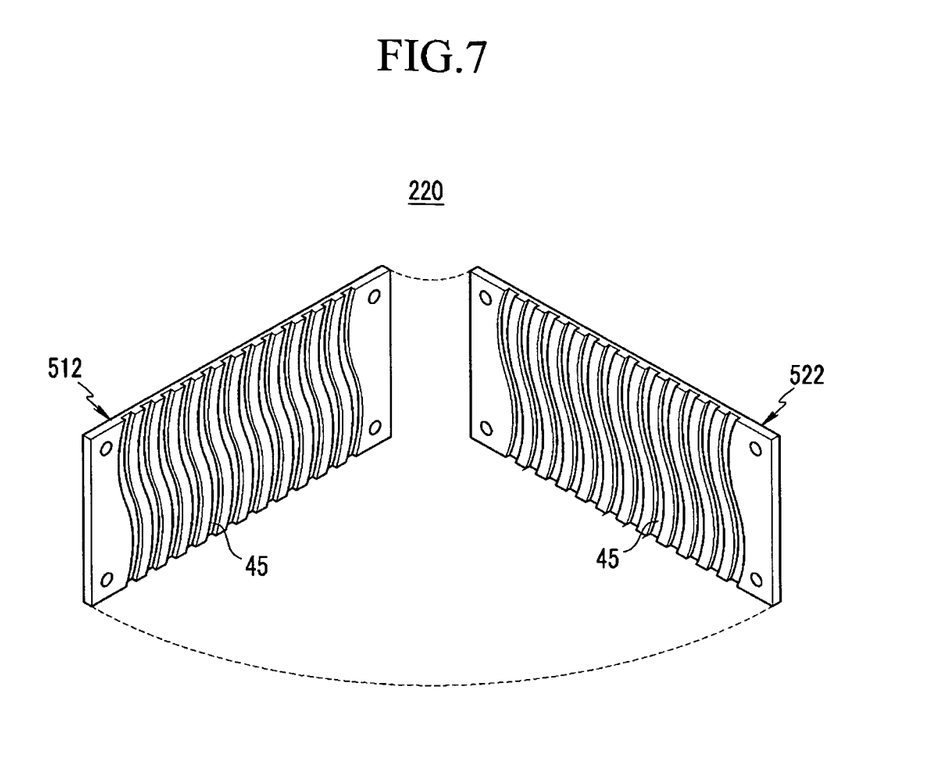
FIG. 7 illustrates an exploded perspective view of a bipolar plate in a fuel cell stack according to yet another embodiment.

FIG. 7 illustrates an exploded perspective view of a bipolar plate in a fuel cell stack according to yet another embodiment.

Referring to FIG. 7, the bipolar plate 220 according to the present embodiment may be the same as the bipolar plate according to the previous embodiment, except that a plurality of half cooling channels 45 may have two curvature centers. In this instance, the two curvature centers may be disposed in opposite directions, i.e., may have opposite concavities, from each other.

That is, when the first and second sub-plates 512 and 522 are divided into two areas with respect to the long-axis direction, a curvature center of a half cooling channel 45 may be disposed in a right part of the first area (upper area) and a curvature center of a half cooling channel 45 may be disposed in a left part of the second area (lower area) with reference to the drawing. A plurality of half cooling channels 45 may be formed such that one curvature center thereof may be provided in the upper, i.e., first, area and another curvature center thereof may be provided in the lower, i.e., second, area. In addition, the curvature centers of the respective cooling channels 45 may have opposite concavities.

Accordingly, as the plurality of half cooling channels 45 have a rough S shape, the cooling channel may be uniformly formed over the bipolar plate 220, thereby providing cooling efficiency over the fuel cell stack 110.

The first and second sub-plates of an embodiment may include a plurality of cooling channels in a curved shape in a short-axis direction. In addition, even if a part where the cooling channels are formed may be very thin, flexural strength of the first and second sub-plates may be sufficiently maintained in a length direction of the facing cooling channels. Therefore, the first and second sub-plates may maintain a plane state in the length direction after a molding process and may not be bent.

According to an embodiment, since the plurality of cooling channels may be bent as a curve, it is possible to prevent the bipolar plate from being bent by increasing flexural strength in the length direction of the bipolar plate. Further, since the plurality of cooling channels are not steeply bent but are smoothly bent at a specific part, generation of resistance for a cooling fluid flow may be minimized to increase cooling efficiency of the fuel cell stack.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A fuel cell stack, comprising:
   a plurality of membrane electrode assemblies, the membrane electrode assemblies generating electrical energy by an electrochemical reaction of a fuel and an oxidizer; and
   a plurality of bipolar plates positioned adjacent to the membrane electrode assemblies and between the membrane electrode assemblies, the bipolar plates including a fuel channel at one side thereof and an oxidizer channel at a second, opposite side thereof, wherein the bipolar plates include a plurality of cooling channels penetrating therethrough, all of the cooling channels being curved and having a same curvature along a length thereof.

2. The fuel cell stack as claimed in claim 1, wherein:
   the bipolar plate has a quadrangle shape, and
   the plurality of cooling channels connect two short sides of the bipolar plate.

3. The fuel cell stack as claimed in claim 2, wherein the curvature of the plurality of cooling channels is concave toward a center of the bipolar plate.

4. The fuel cell stack as claimed in claim 3, wherein the plurality of cooling channels have a same width.

5. The fuel cell stack as claimed in claim 3, wherein a cooling channel at a center of the bipolar plate from among the plurality of cooling channels has a width greater than a width of a cooling channel near an end of the bipolar plate.

6. The fuel cell stack as claimed in claim 5, wherein two cooling channels at an innermost part of the bipolar plate from among the plurality of cooling channels have a width greater than a width of other cooling channels.

7. The fuel cell stack as claimed in claim 2, wherein:
   each cooling channel has two curvature centers, and
   the two curvature centers are provided at opposite sides of each other with respect to a long axis of the bipolar plate.

8. The fuel cell stack as claimed in claim 2, wherein the curvature of the cooling channels is set such that an opposite terminal of the cooling channel is not exposed when the bipolar plate is observed at a terminal of the cooling channel on one of the short sides.

9. The fuel cell stack as claimed in claim 1, wherein the bipolar plate has an assembly structure including:
   a first sub-plate having a first side on which the fuel channel is formed and a second side on which a half cooling channel is formed, and
   a second sub-plate having a first side on which the oxidizer channel is formed and a second opposite side on which a half cooling channel is formed.

10. The fuel cell stack as claimed in claim 9, wherein:
    the half cooling channel of the first sub-plate and the half cooling channel of the second sub-plate form the cooling channel, and
    the two half cooling channels have the same width and depth.

11. A fuel cell system, comprising:
    a fuel cell stack including:
       a plurality of membrane electrode assemblies, and
       a plurality of bipolar plates between the membrane electrode assemblies, the bipolar plates including a plurality of cooling channels;
    a fuel supply connected to the fuel cell stack;
    an oxidizer supply connected to the fuel cell stack; and
    a ventilator adjacent to the plurality of cooling channels, the ventilator providing a cooling fluid to the plurality of cooling channels, wherein the plurality of cooling channels are all curved from one side of the bipolar plate to an opposite side thereof and penetrate the bipolar plate and have a same curvature along a length thereof.

12. The fuel cell system as claimed in claim 11, wherein:
    the bipolar plate has a quadrangle shape,
    the plurality of cooling channels connect two short sides of the bipolar plate, and
    the ventilator is adjacent to one short side of the bipolar plate.

13. The fuel cell system as claimed in claim 12, wherein the plurality of cooling channels are curved to be concave toward a center of the bipolar plate.

14. The fuel cell system as claimed in claim 12, wherein the plurality of cooling channels have two curvature centers, the two curvature centers being at opposite sides of the bipolar plate.

15. The fuel cell system as claimed in claim 13, wherein a curvature of the cooling channels is set such that an opposite terminal of the cooling channel is not exposed when the bipolar plate is observed at one of the short sides.

* * * * *